United States Patent

[11] 3,570,546

| [72] | Inventor | James H. Jackson |
| | | Powderly, Tex. |
| [21] | Appl. No. | 801,582 |
| [22] | Filed | Feb. 24, 1969 |
| [45] | Patented | Mar. 16, 1971 |
| [73] | Assignee | The Superior Switchboard Devices Company |
| | | Canton, Ohio |

[54] LAY-IN CONDUIT DUCT
5 Claims, 6 Drawing Figs.

[52] U.S. Cl. .................................................. 138/155,
174/68, 174/101
[51] Int. Cl. .................................................. H02g 3/06
[50] Field of Search .......................................... 285/373,
121; 138/155, 100, 102, 106, 107, 108; 174/68 (C), 101

[56] References Cited
UNITED STATES PATENTS

| 3,003,794 | 10/1961 | Burley | 174/68C |
| 3,370,121 | 2/1968 | Merckle | 174/101 |

*Primary Examiner*—Henry S. Jaudon
*Attorney*—Hamilton, Cook, Renner & Kenner

ABSTRACT: A fluidtight, lay-in duct for a conduit, having adjoining trough sections with flanges which are joined with an interposed gasket and having upstanding sidewalls terminating in sealing surfaces which are sealingly closed over a portion of their longitudinal extent by spaced trough covers having mating sealing members. The portion between the spaced trough covers is sealed by a removable insert spanning the joint between the trough sections and having a plate portion traversing the upstanding sidewalls, projecting flanges on the plate underlapping the trough covers, and sealing members between the removable insert and the sealing surfaces and trough covers.

Patented March 16, 1971
3,570,546
2 Sheets-Sheet 1
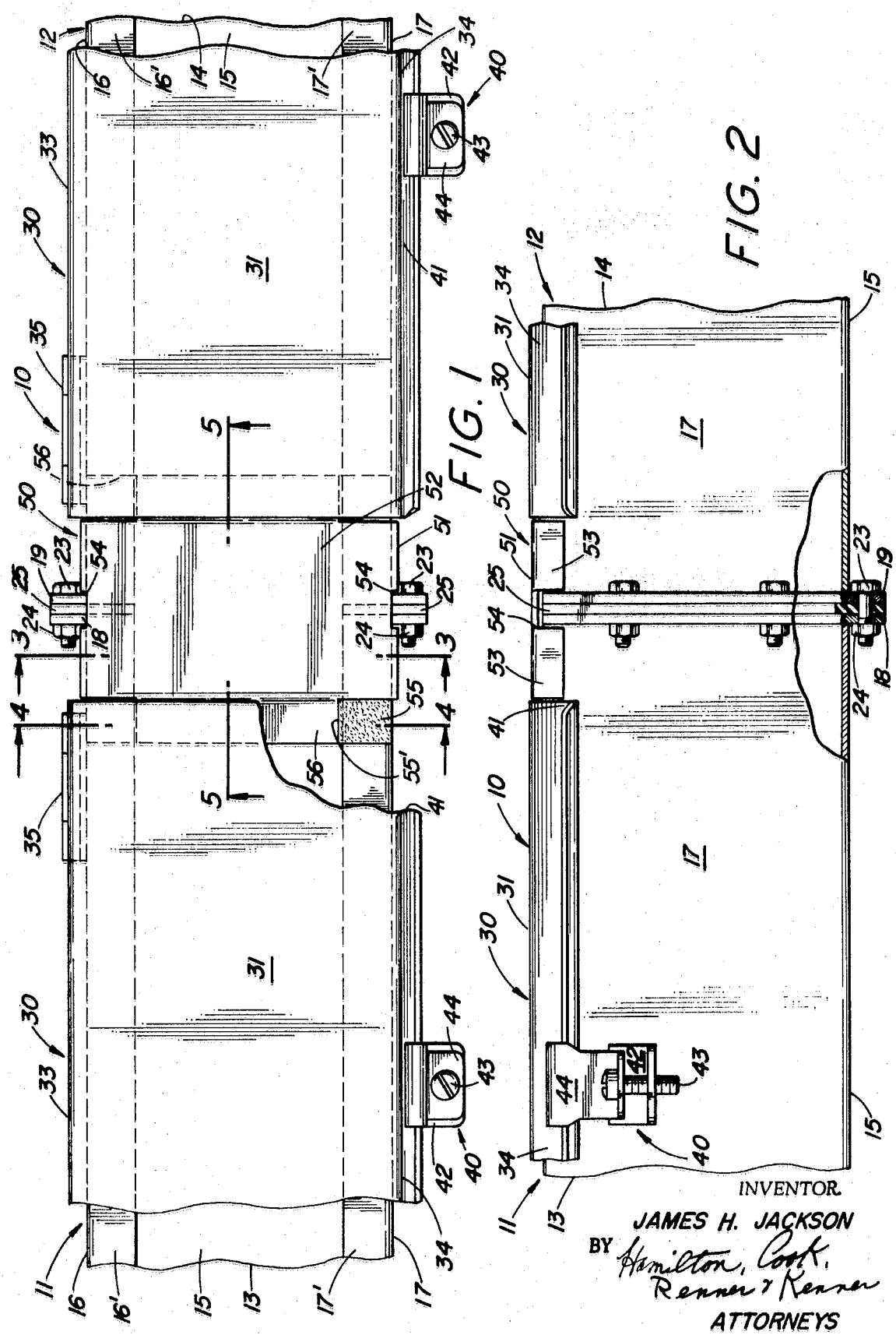
INVENTOR.
JAMES H. JACKSON
BY Hamilton, Cook,
Renner & Renner
ATTORNEYS Patented March 16, 1971
3,570,546
2 Sheets-Sheet 2
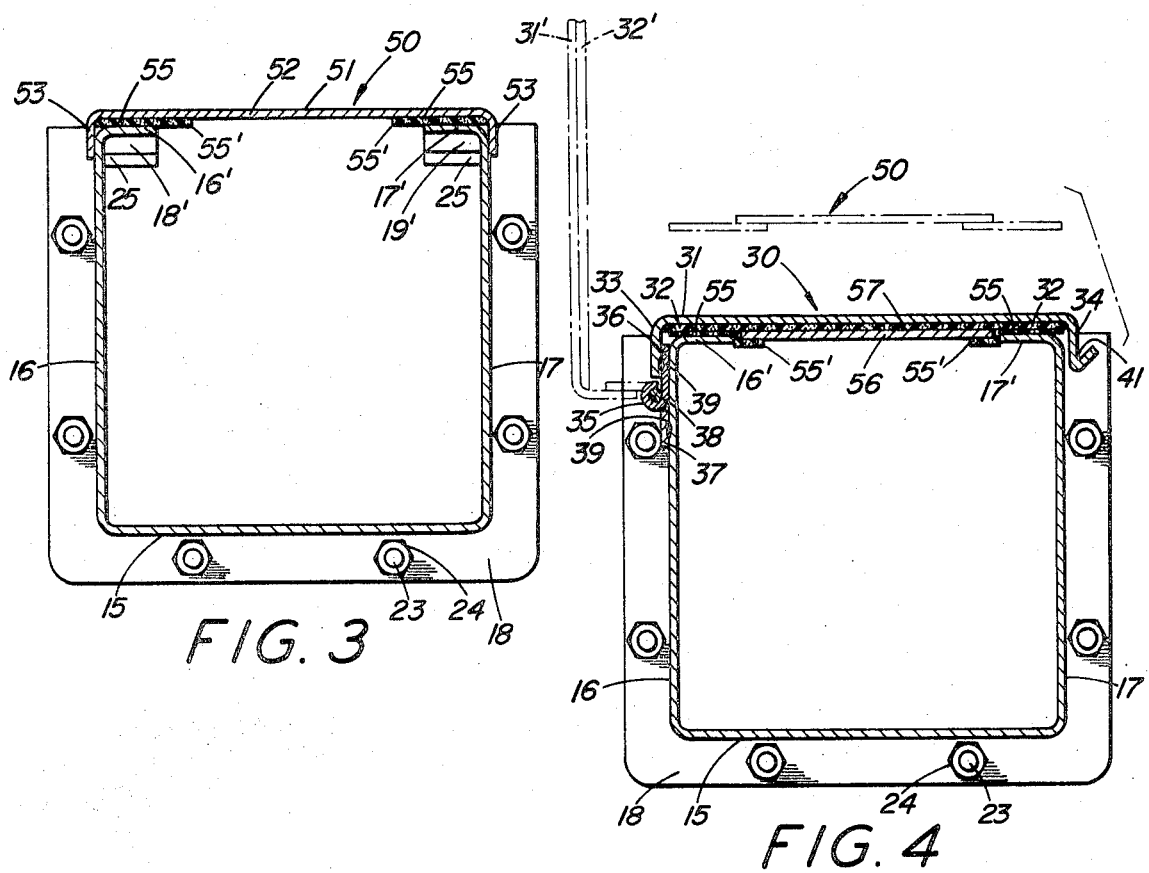
FIG. 3
FIG. 4
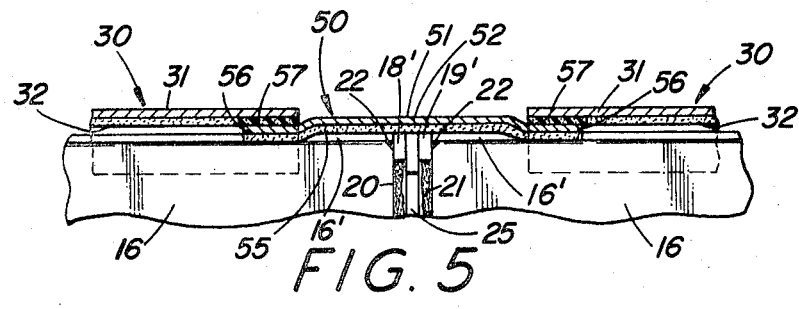
FIG. 5
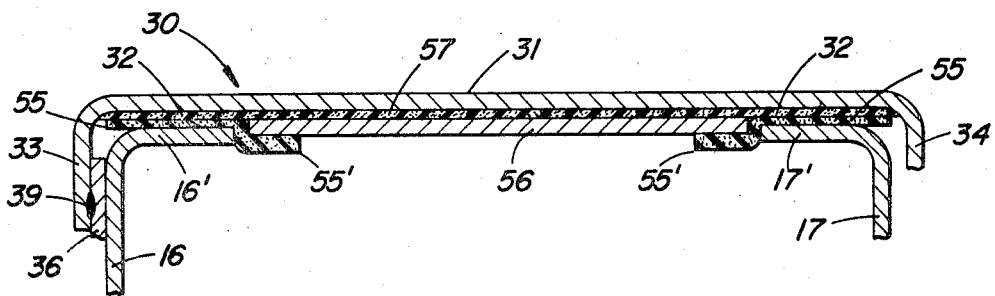
FIG. 6
INVENTOR.
JAMES H. JACKSON
BY Hamilton, Cook,
Renner & Kenner
ATTORNEYS

LAY-IN CONDUIT DUCT

BACKGROUND OF THE INVENTION

Lay-in conduit ducts are employed in installations where it is necessary or desirable to enclose a conduit and have complete access to the interior of the duct through its entire length. In some instances the conduits are conductor wires, cables, or hoses having a size and composition such that the inherent rigidity effectively precludes or renders difficult the bending or coiling necessary for positioning these members in other than completely accessible or open ducts. Since long spans of conduit ducting are frequently employed, it is necessary for ease of construction and installation to manufacture the ducting in sections which are subsequently joined in some manner during assembly at the installation site.

More recently, the function of lay-in conduit ducts has been expanded from that of restraining one or more conduits to that of enclosing conduits in a fluidtight environment. This has been brought about due to the frequent use of these ducts in manufacturing facilities or outdoors where they may be subjected to dirt, water, oil, or other chemicals which can prove deleterious to the conduit materials. As a result efforts have been made to design ducts preserving the complete access or lay-in feature, while providing substantially tight joints between the sections and covers which tend to make the entire extent of a duct system highly impervious to environmental substances.

To date, the ducts designed to meet these requirements have been relatively complex and less than totally successful in achieving the desired high degree of fluidtight integrity. A particularly troublesome problem has involved the efforts to design the necessary removable insert for placement at the joint or juncture of adjacent duct sections which will effect a total seal with each duct section and the covers for each of the troughlike duct sections. Certain prior art ducts have employed dual plate inserts which are clamped between the sides of the duct sections defining the opening at the juncture between sections and which also cooperate with the covers, thereby endeavoring to effect seals between these elements by the use of appropriately placed gasket materials. However, the interrelation between the components frequently produces areas where the gasket material does not firmly contact or is without an engaging surface, as where two metal surfaces are placed in abutting relationship, thereby forming a channel or unsealed passage through which foreign material may enter the duct. Other disadvantages of devices of this nature include the relatively high number of individual components required and the time expended and difficulty normally encountered in placing, aligning, and securing the components.

SUMMARY OF THE INVENTION

It is therefore an object of the present invention to provide a lay-in conduit duct which allows complete access throughout its length for the insertion of conduit, yet can be selectively closed to provide a totally fluidtight enclosure. Another object of the invention is to provide such apparatus having a removable insert which can be quickly and easily positioned and aligned at the installation site. A further object of the invention is to provide such an insert which can be readily removed for the rapid access to or removal and replacement of the conduit contained therein.

It is still a further object of the invention to provide a lay-in conduit duct having a removable insert which is of single piece relatively noncomplex construction. An additional object of the invention is to provide such a removable insert which is exactly self-aligning when placed in position and which requires no separate screws, bolts, or other fasteners to maintain it in position. Still another object is to provide an insert constructed in such a manner as to provide a continuous sealing surface in all areas abutting other components, thereby maintaining absolute fluidtight integrity.

Generally, the invention relates to a removable insert for maintaining the watertight integrity of a lay-in duct for conduit constructed of a plurality of adjoining trough sections having spaced trough covers, said removable insert traversing the trough sections, extending between the covers, and having sealing members interposed between it and the trough sections and the covers for the trough sections.

DESCRIPTION OF THE DRAWINGS

FIG. 1 is a fragmentary top plan view of a portion of an exemplary lay-in conduit duct according to the present invention having a portion broken away and showing particularly the junction between adjoining trough sections.

FIG. 2 is a fragmentary front elevation view of the lay-in conduit duct of FIG. 1, also showing particularly the junction between adjoining trough sections.

FIG. 3 is a section view taken substantially along the line 3-3 of FIG. 1 and showing particularly the seal between a trough section and the removable insert positioned between trough sections.

FIG. 4 is a section view taken substantially along line 4-4 of FIG. 1 and showing particularly the seal between a trough cover and the removable insert, wherein the cover is shown in chain lines in its raised position and the removable insert is similarly shown in a raised detached position.

FIG. 5 is a fragmentary section view with portions broken away taken substantially along line 5-5 of FIG. 1 and further showing the sealing relation between the trough cover and the removable insert.

FIG. 6 is an enlarged fragmentary section view similar to FIG. 4 showing in greater detail the seals between a removable insert and the trough sections and trough covers.

DESCRIPTION OF A PREFERRED EMBODIMENT

Referring to the drawings and particularly FIGS. 1 and 2 thereof, a fragmentary portion of a lay-in conduit duct according to the present invention is indicated generally by the numeral 10. The duct 10 is composed of a plurality of individual trough sections, generally indicated by the numerals 11 and 12, which are of suitable cross-sectional dimension to enclose a plurality of conduits and of sufficient length to enclose a substantial extent of conduit while retaining size and weight characteristics compatible with ease of handling. If desired, the trough sections 11, 12 may be made in a plurality of lengths to satisfy the parameters of various installations and may have bends or elbows of differing degrees to accomplish desired changes in direction over a length of the duct. 10.

Since the portions of trough section 11 and 12 are preferably identical near their extremities, regardless of length and bends or elbows, only representative portions of trough sections 11, 12 near their junction are depicted. As shown in FIGS. 1—4, the trough sections 11, 12 have generally U-shaped channel portions 13 and 14, respectively, each consisting of a web 15 which spaces and joins a pair of upstanding sidewalls 16 and 17 having sealing surfaces 16' and 17' at their extremities opposite web 15. For ease of fabrication, the channel portions 13, 14 may be made of a single, integral piece of material appropriately shaped, or of sheet material welded at the juncture between the web 15 and sidewalls 16 and 17 to effect a fluid tight seal.

Adjoining trough sections 11, 12 are selectively sealed and joined by angularly extending flanges 18 and 19, respectively, which preferably extend outwardly for ease of attachment and detachment, as more fully detailed hereinafter. The flanges 18, 19 are sealingly attached to the trough sections 11, 12 as by continuous seam welds 20 and 21, respectively, extending along sidewalls 16, 17 and webs 15 (FIG. 5). In order to facilitate sealing the opening in trough sections 11, 12, the flanges 18, 19 extend inwardly from a position coplanar with sealing surfaces 16', 17' to form flange portions 18' and 19' (FIG. 5) which are attached to sealing surfaces 16', 17' by continuous seam welds 22. The flanges 18, 19 are preferably of identical configuration for mating alignment and are adapted to be secured together by removable fasteners, such as a plurality of bolts 23 which extend through coincident bores (not shown) and are held by engaging nuts 24.

To provide the requisite fluidtight integrity of the duct 10, a seal is provided where trough sections 11, 12 are joined by their respective flanges 18, 19 and 18' and 19'. This may be advantageously accomplished by employing a gasket 25 having substantially the same configuration as the flanges. The gasket 25 may be made of any conventional somewhat resilient sealing material which will withstand the destructive environmental substances which may be encountered in the particular application. One material having appropriate characteristics for most circumstances is neoprene. Thus, the troughs 11, 12 are joined in fluidtight relation by interposing the gasket 25 between the flanges 18, 19 and pulling the members into sealing contact by inserting the bolts 23 and drawing down the nuts 24 which are readily accessible outwardly of the duct 10.

The opening formed by the sidewalls 16, 17 of each of trough sections 11, 12 are selectively closed to maintain longitudinal fluidtight integrity by a closure assembly, generally indicated by the numeral 30. As best seen in FIGS. 1, 2, and 4, each closure assembly 30 has a cover plate 31 which is of slightly lesser longitudinal dimension than the troughs 11, 12 for a reason hereinafter described and which is of sufficient transverse extent to at least partially overlap the sealing surfaces 16', 17'. The covers 31 each have a longitudinal sealing member 32 extending along either side of its undersurface positioned to engage the sealing surfaces 16' and 17', respectively. As seen in FIGS. 4 and 5, the sealing members 32 constitute strip material, preferably cemented or bonded to covers 31 to eliminate possible problems such as misalignment or loss of the sealing members 32.

In order to protect the sealing members 32 and facilitate attachment of the closure assembly 30 to troughs 11, 12, the covers 31 may be provided with downturned flanges 33 and 34 which are located substantially parallel to and proximate the sidewalls 16 and 17, respectively. As shown, the downturned flanges 33, 34 extend beyond the sealing members 32 to preclude direct incidence of any environmental substances, except in the narrow opening between sidewalls 16, 17 and downturned flanges 33, 34. The flanges 33 also serve as connectors for hinges 35 having a leg 36 attached to the flanges 33 and a second leg 37 attached to the sidewalls 16, legs 36 rotating about the pivot pin 38, as shown in chain lines in FIG. 4. The legs 36 and 37 may be secured to the flanges 33 and sidewalls 16 by a plurality of spot welds 39 or any other suitable means of attachment. The hinges 35 are positioned so that the covers 31 carrying sealing members 32 pivot into engagement with the sealing surfaces 16', 17' and away therefrom to the chain line position 31', 32' (FIG. 4) to allow unobstructed access to the trough sections 11, 12.

The cover 31 is variably clamped into sealing engagement with the troughs 11, 12 by an adjustable fastener assembly, generally indicated by the numeral 40 in FIGS. 1 and 2. As shown, the flanges 34 have longitudinal extremities turned upwardly to form channels 41 (FIG. 4). The sidewalls 17 have attached angle brackets 42 which are threaded to receive screws 43 that carry hooks 44 adapted to engage the V-shaped channels 41. The hooks 44 have bores (not shown) which receive screws 43 that preferably have shanks of lesser diameter to provide a degree of twisting freedom, thereby facilitating engagement and disengagement of hooks 44 with V-shaped channels 41 with minimum adjustment of screws 43. Although adjustable fastener assemblies could be provided on both sides of cover 31 to eliminate the hinges 35, a separate cover would be more susceptible of being misplaced or improperly positioned.

The trough sections 11, 12 making up a span of duct 10 therefore have total fluidtight integrity, as already described, except at the junction between adjacent troughs 11, 12 where the covers 31 are spaced apart a distance due to their lesser longitudinal dimension. The lay-in feature for continuous conduit of the duct 10 and the sealing requirements are provided by a removable insert, generally indicated d by the numeral 50. The removable insert 50 has a gusset plate 51 which engages the sealing surfaces 16', 17' and the covers 31 of each of troughs 11, 12. As shown, the gusset plate 51 has a generally flat body portion 52 extending transversely of troughs 11, 12 and seated outwardly of the sealing surfaces 16', 17' between the extremities of adjacent covers 31. The transverse extremities of gusset plate 51 have downturned flanges 53 which preferably engage or are substantially proximate to the sidewalls 16, 17 (FIGS. 2 and 3), thereby providing precise positioning of removable insert 50 laterally of troughs 11, 12. Each of the overlapping flanges 53 has a slot 54 extending approximately to the body portion 52 and having a width slightly greater than that of the combined thickness of flanges 18 and 19 and the gasket 25, when assembled, to receive these members and precisely position gusset plate 51 longitudinally of the troughs 11, 12 (FIG. 2).

Referring particularly to FIGS. 3—5, the gusset plate 51 in the area of the sealing surfaces 16', 17' extends longitudinally of troughs 11, 12 to a position underlapping the longitudinal extremities of each of the covers 31. Longitudinal sealing strips 55 are positioned between the gusset plate 51 and the sealing surfaces 16', 17' and span the flange portions 18', 19'. The sealing strips 55 may conveniently be cemented or otherwise bonded to the gusset plate 51. It is a significant feature of the present invention that the sealing strips 55 have edges 55' extending inwardly of the sealing surfaces 16', 17' (FIGS. 3 and 5), and some distance beyond the longitudinal extremities of the gusset plate 51 in the area of the sealing surfaces 16', 17' (FIG. 1) for a reason hereinafter described.

The gusset plate 51 contacts the covers 31 by means of underlapping offset flanges 56 which are displaced downwardly for sealing engagement with the undersurfaces of the extremities of the covers 31 longitudinally of the troughs 11, 12 (FIG. 5). In order to facilitate effecting an appropriate seal, the offset flanges 56 extend transversely of troughs to a position proximate, but not abutting the edge of sealing surfaces 16', 17' in order that the edges 55' of sealing strips 55 may extend between and sealingly engage these members, as best seen in FIGS. 4 and 6, when the cover 31 is drawn down by the adjustable fastener assembly 40 so that the offset flanges 56 are positioned adjacent or slightly into the plane of the sealing surfaces 16' and 17'.

A seal is effected between between the offset flanges 56 of gusset plate 51 and the covers 31 by means of another sealing strip portion 57 of sealing member 32 which is preferably cemented or otherwise bonded to each cover 31 and extends between the sealing members 32; however, sealing strip 57 could be attached to the upper surface of each underlapping offset flange 56 across its entire length.

It should be noted that sealing members 32 and sealing strips 55 and 57 should be of a somewhat resilient material such as sponge, foam, expanded cellular rubber, or rubberlike material which is of sufficient thickness to effect the various seals indicated, yet capable of sufficient compression to allow the imposition of two sealing material thicknesses in the areas where sealing members 32 and sealing strips 55 are overlaid (See FIGS. 4 and 6), although sealing members 32 might be terminated just short of overlapping sealing strips 55.

It can thus be seen that the disclosed apparatus provides a totally sealed lay-in conduit duct carrying out the various objects set forth above. Since various modifications in details, materials and arrangements of parts are within the spirit of the invention herein disclosed and described, the scope of the invention should be limited solely by the scope of the attached claims.

I claim:

1. In a lay-in duct for conduit having adjoining trough sections joined by flanges with an interposed abutting gasket and provided with upstanding sidewalls terminating in sealing surfaces selectively sealingly closed over a portion of their longitudinal extent by spaced trough covers having mating sealing members, removable insert means spanning adjoining trough sections comprising, gusset plate means extending transversely of and supported by the trough sections, projecting flange means on said gusset plate means underlapping the spaced trough covers and extending transversely of the trough sections to a position proximate the sealing surfaces of the upstanding sidewalls, first sealing means interposed between said gusset plate means and the sealing surfaces and having edges extending inwardly of the sealing surfaces and between the extremities of the sealing surfaces and of the projecting flange means when the trough covers are closed, and second sealing means interposed between said projecting flange means and the adjacent trough covers, whereby closure of the trough covers provides a continuous seal of the trough sections for absolute fluidtight integrity of the duct.

2. Apparatus according to claim 1, wherein said first sealing strips extend along said sealing surfaces beyond said body portion of said gusset plate and are engaged by the sealing members on the trough covers.

3. Apparatus according to claim 1, wherein said gusset plate means has a body portion supported on and seated outwardly of the sealing surfaces and the projecting flange means is offset to reside under the trough covers.

4. Apparatus according to claim 3, wherein said gusset plate means has extending flanges engaging the upstanding sidewalls of the trough sections, thereby positioning said gusset plate means laterally of the trough sections.

5. Apparatus according to claim 4, wherein said extending flanges of said gusset plate means are notches notched to receive the flanges of adjacent trough sections and an interposed gasket, thereby positioning said gusset plate means longitudinally of the trough sections.